United States Patent
Gatherar

(12) 
(10) Patent No.: US 6,481,504 B1
(45) Date of Patent: Nov. 19, 2002

(54) FLOWLINE CONNECTOR WITH SUBSEA EQUIPMENT PACKAGE

(75) Inventor: Nicholas Gatherar, Midlothian (GB)

(73) Assignee: FMC Corporation, Chicago, IL (US)

( * ) Notice: Subject to any disclaimer, the term of this patent is extended or adjusted under 35 U.S.C. 154(b) by 0 days.

(21) Appl. No.: 09/606,767

(22) Filed: Jun. 29, 2000

(30) Foreign Application Priority Data

Jun. 29, 1999 (GB) .............................................. 9915227

(51) Int. Cl.[7] .............................................. E21B 43/013
(52) U.S. Cl. ........................ 166/344; 166/351; 166/368; 405/169
(58) Field of Search ................................ 166/339, 340, 166/341, 344, 347, 349, 351, 357, 368, 338; 405/158, 169

(56) References Cited

U.S. PATENT DOCUMENTS

| | | | |
|---|---|---|---|
| 3,431,739 A | 3/1969 | Richardson et al. .......... 61/72.3 |
| 3,473,605 A | * 10/1969 | Thuse et al. ................. 166/338 |
| RE31,265 E | * 6/1983 | Sinclair et al. .............. 405/169 |
| 4,541,753 A | 9/1985 | Langner ...................... 405/166 |
| 4,695,189 A | 9/1987 | Wallace ....................... 405/169 |
| 4,877,356 A | 10/1989 | Bontenbal | |
| 5,320,175 A | 6/1994 | Ritter et al. | |
| 5,507,858 A | * 4/1996 | Jepson ........................ 166/357 |
| 5,722,796 A | 3/1998 | Araujo et al. | |

FOREIGN PATENT DOCUMENTS

| WO | 96/29532 | 9/1996 | ........... F16L/37/00 |
|---|---|---|---|
| WO | 99/23349 | 5/1999 | ......... E21B/33/035 |

* cited by examiner

Primary Examiner—David Bagnell
Assistant Examiner—John Kreck
(74) Attorney, Agent, or Firm—Pauley Petersen Kinne & Erickson

(57) ABSTRACT

A flowline connector having a first connector portion for mounting on a first piece of subsea equipment, such as a wellhead. A second connector portion of the flowline connector is attached to an end portion of a flowline. Each connector portion has a respective guide interengageable by lowering the second connector portion, on the end portion of the flowline, into the first connector portion. The guides allow the second connector portion to pivot relative to the first connector portion to bring the first connector portion and the second connector portion into axial alignment for make-up of a fluid tight connection therebetween. The second connector portion has a subsea equipment package, for example chokes, gas/water separators, gas liquifiers, pumps and the like, for connection to the first piece of the subsea equipment.

14 Claims, 1 Drawing Sheet

FLOWLINE CONNECTOR WITH SUBSEA EQUIPMENT PACKAGE

FIELD OF THE INVENTION

Figure 1:
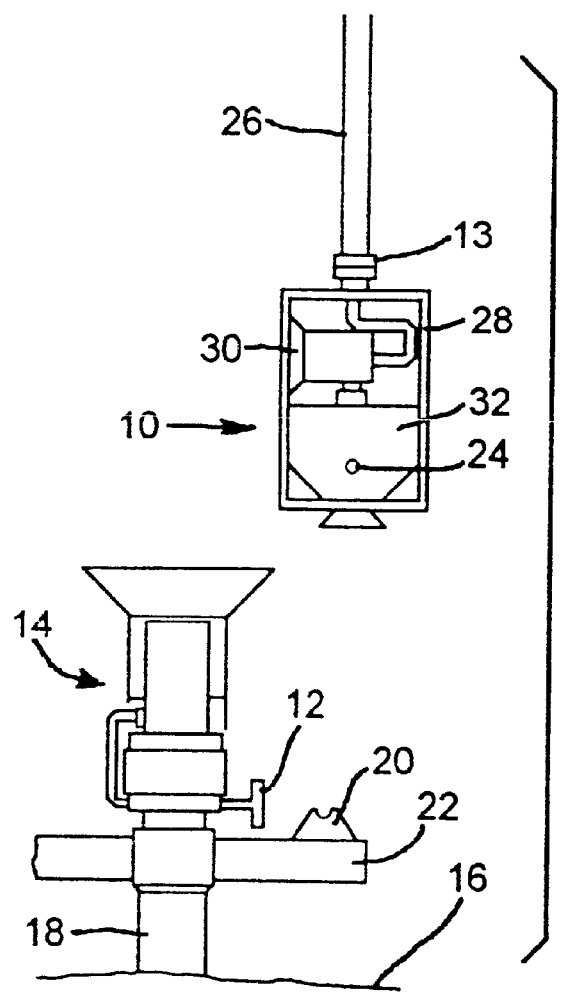

This invention concerns connectors for subsea flowlines or jumpers used in oil and gas production.

BACKGROUND OF THE INVENTION

Flowlines are used to interconnect pieces of subsea oilfield equipment for fluid communication. They generally take the form of somewhat flexible armoured hoses or pipes, provided with subsea matable connectors at either end. Typically, they are installed by being lowered into place from a pipe laying vessel, with the final positioning and makeup of the end connectors done by divers or by an ROV. Short diver or ROV installable hoses and pipes used to interconnect adjacent pieces of subsea equipment are known as jumpers. Several individual conduits may be bundled together in parallel to form a single flowline.

Examples of subsea equipment that may be interconnected using flowlines or jumpers include subsea Christmas trees, manifolds and flow control or processing equipment located on the seabed, such as chokes, gas/water separators, pumps and gas liquification plant.

Where there are several different pieces of equipment to be interconnected, installation of the necessary jumpers and flowlines can be time consuming. An end of each flowline is generally lowered vertically to the seabed from a pipe laying vessel, and the flowline is then laid out horizontally between the points to be interconnected. The flowline ends must then be retrieved from the seabed bed by diver or ROV and the end connectors aligned with the subsea equipment for make-up of the required fluid tight connections.

A known type of flowline has a first part mounted to a piece of subsea equipment, such as a wellhead, and a mating second part fitted to the end of a flowline. In use the second part is lowered towards the sea bed and is stabbed from above into the first. A pivot arrangement then guides the second part and attached flowline so as to hinge over into a generally horizontal position, in which the flowline may be laid away along the sea bed, and in which the connector first and second mating parts are axially aligned for make-up of a fluid-tight connection between them. A similar connection technique, but using a separate, hinged flowline connection tool, is disclosed in U.S. Pat. No. 4,541,753.

SUMMARY OF THE INVENTION

The present invention provides a flowline connector having a first portion for mounting on a first piece of subsea equipment and a second portion for attachment to a flowline end, the first and second portions including respective guides interengageable by lowering the second connector portion into or onto the first connector portion, the second connector portion having a subsea flow processing or flow control equipment package for connection to the first piece of subsea equipment, whereby the flowline may be used to support and lower the equipment package into position during connection to the first piece of subsea equipment. In this way the number of subsea connections to be made is reduced, and the equipment package does not have to be separately supported on wireline, drill pipe or the like.

The invention correspondingly provides a method of connecting a subsea equipment package to a first piece of subsea equipment, comprising the steps of:

mounting a first flowline connector portion on the first piece of subsea equipment;

attaching to a flowline end a second flowline connector portion comprising the subsea equipment package;

supporting the second connector portion on the flowline and lowering the flowline end and second connector portion towards the first connector portion; and interengaging respective guides on the first and second connector portions.

The flowline connector of the invention thus provides a simple and convenient way of installing a subsea equipment package that must be connected to and/or mounted on further equipment located on the seabed.

The guides may allow pivoting of the second connector portion relative to the first, to bring the flowline from a generally vertical position to a generally horizontal position and to bring the first and second connector portions into axial alignment for make-up of a fluid tight connection therebetween.

The package may have Christmas tree having for connection to a subsea wellhead, although the invention is of more general applicability. For example, the equipment package can be used to perform production fluid processing functions such as gas liquification or fluid separation, normally carried out further down the production flow stream. It may also having pumps or control and monitoring equipment, such as electrical and/or hydraulic control modules for connection to downhole service lines. The subsea equipment package can be mounted upon or connected to a manifold or other subsea structure besides a wellhead. The connector portions may constitute parts of a hub connector, with the flowline having a plurality of parallel conduits.

For installation, the flowline and second connector may simply be lowered from a pipe laying vessel to bring the guides into engagement (if necessary with ROV or diver assistance). The vessel can then begin laying the flowline in the required direction along the seabed. As the flowline comes to rest on the seabed, the guides preferably allow the second connector portion to pivot on the first, bringing the connector portions into axial alignment. The required fluid tight connection between the connector portions can then be made up, e.g. by relatively straightforward ROV or diver manipulation, or automatically in the case of hydraulically actuated connectors.

Figure 2:
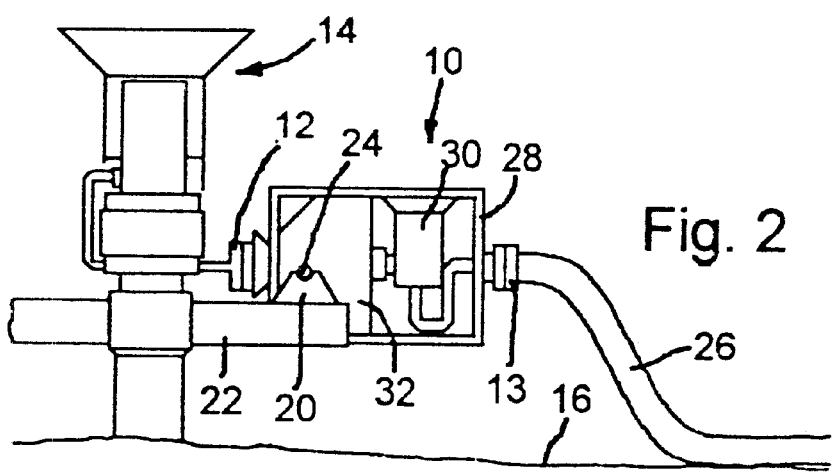

The invention and its preferred features are described below with reference to an illustrative embodiment shown in the drawings, in which:

FIG. 1 shows the connector portions prior to connecting a wellhead to a flowline; and FIG. 2 corresponds to FIG. 1, but shows the wellhead connected to the flowline.

Referring to FIG. 1, the second connector portion 10 is lowered substantially vertically towards the first connector portion 12, which is mounted upon, and in fluid communication with, a subsea wellhead 14. Wellhead 14 is supported on the seabed 16 by a conductor casing 18. A guide associated with the first connector portion 12 takes the form of a pair of receptacles 20 (only one visible) mounted on a guide base 22 supported on the conductor casing 18. A guide 24 associated with the second connector portion 10 is formed by a pair of trunnions or stub-shafts 24 (only one visible) projecting laterally from the second connector portion 10.

The second connector portion 10 is connected in fluid communication with one end of a flowline 26, via a coupling 13. The flowline 26 may be used to lower the second connector portion 10 into position adjacent to the first connector portion 12, e.g. from a pipeline laying vessel (not shown). In use, the stub shafts 24 are stabbed into and received in the receptacles 20 from above. Thereafter, as the flowline 26 is lowered into position on the seabed, the second connector portion 10 can pivot about the stub shafts 24 so as to bring it into axial alignment with the first connector portion 12, as shown in FIG. 2. Suitable stops (not shown) may be provided on the guide base 22 and on a frame 28 of the second connector portion 10 to arrest the pivoting motion when the correct axial alignment is achieved.

The frame 28 houses a package of further subsea equipment, comprising one or more components commonly found in the vicinity of a subsea wellhead. For example a production choke 30, or gas/fluid separators, gas liquification equipment, chemical/gas injection ports, flow meters, detectors, sensors, pumps and the like (not shown) may be housed in the frame 28. The drawings schematically illustrate flow control equipment 32 mounted upstream of the choke 30 and containing flow control valves normally found in a subsea Christmas tree. This enables a simplified design of wellhead 14 to be used, besides leading to greater flexibility in well completion and intervention operations. The Christmas tree components may be installed from a pipe laying vessel, rather than requiring a hoist equipped service vessel and wireline, drill pipe or the like for lowering the components into place. The equipment packaged in the second connector portion 10 is readily retrievable for servicing and repair. As the second connector portion 10 and its equipment package is directly connected to the upstream equipment (the wellhead 14 as shown), rather than being indirectly connected via an upstream flowline, the overall number of subsea flowline connections to be made up is reduced.

Although the drawings illustrate the use of the invention in connecting a flowline to a wellhead, it is equally applicable for the connection of flowlines to other subsea equipment such as manifolds and production fluid processing plant. It is not necessary for the equipment package to pivot relative to the first connector portion. Where pivoting of the flowline from a generally vertical to a generally horizontal orientation is desired during installation, a swivel connection between the flowline and equipment package could be provided instead.

What is claimed is:

1. A flowline connector, comprising:
   a first connector portion mountable on a first piece of subsea equipment, the first connector portion having a first guide; and
   a second connector portion attachable to a flowline end, the second connector portion having a second guide engageable with the first guide, the second connector portion comprising a subsea equipment package for connection to the first piece of subsea equipment;
   wherein with the second connector portion attached to the flowline end, the second connector portion is pivotally movable from a generally vertical first position to a generally horizontal second position axially aligned with the first connector portion.

2. A flowline connector as defined in claim 1, wherein the second connector portion is pivotally connected to the first connector portion, the second connector portion moveable, relative to the first connector portion, between a first position, and a second position axially aligned with the first connector portion.

3. A flowline connector as defined in claim 2, wherein one of the first guide and the second guide comprises a stub shaft and the other of the first guide and the second guide comprises a receptacle.

4. A flowline connector as defined in claim 2, comprising co-operating stops which arrest a pivoting movement of the second connector portion when it is axially aligned with the first connector portion.

5. A flowline connector as defined in claim 1, wherein the first connector portion and the second connector portion further comprise co-operating parts of a hub connector and wherein the flowline comprises a plurality of parallel conduits.

6. A flowline connector as defined in claim 1, wherein the subsea equipment package comprises components of a Christmas tree.

7. A flowline connector as defined in claim 1, wherein the subsea equipment package comprises a production choke.

8. A flowline connector as defined in claim 1, wherein the subsea equipment package comprises a production fluid processing equipment package.

9. A flowline connector as defined in claim 1, wherein the subsea equipment package comprises control and monitoring equipment.

10. A flowline connector as defined in claim 1, wherein the second connector portion further comprises a frame, the frame housing the subsea equipment package.

11. A flowline connector as defined in claim 10, wherein the subsea equipment package is directly connected to the first piece of subsea equipment.

12. A flowline connector as defined in claim 10, wherein the subsea equipment package comprises a subsea flow processing equipment package.

13. A flowline connector as defined in claim 10, wherein the subsea equipment package comprises a subsea flow control equipment package.

14. A flowline connector as defined in claim 1, wherein the first connector portion comprises a first stop, the second connector portion comprises a second stop, and the second stop contacts the first stop when the second connector portion is axially aligned with the first connector portion.

* * * * *